United States Patent [19]

Hulsing et al.

[11] Patent Number: 4,799,385
[45] Date of Patent: Jan. 24, 1989

[54] ANGULAR RATE SENSOR WITH PHASE SHIFT CORRECTION

[75] Inventors: Rand H. Hulsing, Redmond; Rex B. Peters, Woodinville, both of Wash.

[73] Assignee: Sundstrand Data Control, Inc., Redmond, Wash.

[21] Appl. No.: 72,235

[22] Filed: Jul. 10, 1987

[51] Int. Cl.$^4$ .................................................. G01P 9/04
[52] U.S. Cl. ........................................ 73/505; 73/510
[58] Field of Search ................... 73/505, 510, 517 R; 364/453

[56] References Cited

U.S. PATENT DOCUMENTS

| | | | |
|---|---|---|---|
| 4,445,376 | 5/1984 | Merhav | 73/510 |
| 4,510,802 | 4/1985 | Peters | 73/505 |
| 4,590,801 | 5/1986 | Merhav | 73/510 |
| 4,665,748 | 5/1987 | Peters | 73/505 |

*Primary Examiner*—John Chapman
*Attorney, Agent, or Firm*—Christensen, O'Connor, Johnson & Kindness

[57] ABSTRACT

A Coriolis rate sensor comprising first and second accelerometers mounted with their force sensing axes parallel to a common sensing axis. The accelerometers are vibrated along arcs in response to a periodic drive signal at a first frequency, each arc being tangent to a vibration axis normal to the sensing axis. The accelerometer output signals are demodulated to determine angular rate, as well as to detect the phase shift between the drive signal and the periodic compounds of the output signals. In one arrangement, the detected phase shifts are used to drive a phase servo that tends to reduce the bias error caused by interaction between the phase shifts and misalignments of the accelerometers with respect to the sensing axis. In another arrangement, the phase shifts are used to calculate a bias term for correcting the measured angular rate. A single accelerometer embodiment is also described.

19 Claims, 3 Drawing Sheets

ANGULAR RATE SENSOR WITH PHASE SHIFT CORRECTION

TECHNICAL FIELD

The present invention relates to an apparatus for determining angular rate of rotation utilizing accelerometers.

BACKGROUND OF THE INVENTION

Angular rate of rotation about a given coordinate axis may be measured by moving (e.g., vibrating) an accelerometer along an axis normal to the accelerometer's sensitive axis and normal to the rate axis about which rotation is to be measured. For example, consider a set of X, Y, Z coordinate axes fixed in a body whose rotation rate is to be measured, and an accelerometer also fixed in the body with its sensitive axis aligned along the Z axis. If the angular rotation vector of the body includes a component along the X axis, then periodic motion of the accelerometer along the Y axis will result in a periodic Coriolis acceleration acting in the Z direction that will be sensed by the accelerometer. The magnitude of the Coriolis acceleration is proportional to the velocity along the Y axis and the rotation rate about the X axis. As a result, the output of the accelerometer includes a DC or slowly changing component that represents the linear acceleration of the body along the Z axis, and a periodic component that represents the rotation of the body about the X axis. The accelerometer output can be processed, along with the outputs of accelerometers that have their sensitive axes in the X and Y directions and that are moved along the Z and X axes, respectively, to yield linear acceleration and angular rate about the X, Y and Z axes. Such signal processing is described in U.S. Pat. Nos. 4,445,375 and 4,590,801.

As described in U.S. Pat. No. 4,590,801, one preferred embodiment of a rotation rate sensor comprises, for each axis, two accelerometers oriented with their sensitive axes parallel or antiparallel to one another, and means for vibrating the accelerometers along an axis normal to their sensitive axes. A suitable method for vibrating such accelerometer pairs is described in U.S. Pat. No. 4,510,802. In the system described in that patent, a parallelogram structure is used to vibrate the accelerometers along a common vibration axis. In such an arrangement, it may be demonstrated that a bias error is produced by interaction between misalignment of the accelerometers with respect to the desired sensitive axis, and the phase shift between the motion of the accelerometers and their resulting output signals. This bias error results from the fact that the misalignment causes the accelerometer to sense a component of the acceleration used to vibrate the accelerometers. In the absence of any phase shift, this component is synchronous with the acceleration caused by the vibration, and therefore 90° out of phase with the vibration velocity and therefore with the Coriolis acceleration. The vibration acceleration therefore would be cancelled in the rate channel. However because of the phase shift introduced by the accelerometer between its vibration velocity and the Coriolis component of its output signal, the vibration acceleration component is phase shifted so that it includes a subcomponent that is in phase with the vibration velocity, and that therefore shows up in the rate channel. This interaction between misalignment and phase shift is the largest source of bias error in an angular rate sensor of this type.

An approach to eliminating the above-described rate bias is set forth in U.S. Pat. No. 4,665,748. In the system described in that patent, the angular rate output of the accelerometers is demodulated by a signal in phase with the accelerometer motion, to produce a feedback signal that is used to drive the components of the accelerometer output signal that are synchronous with the accelerometer motion toward a null value. The present invention relates to an improved technique for reducing the bias error caused by interaction between misalignment and phase shift of the accelerometers.

SUMMARY OF THE INVENTION

The present invention provides an angular rate sensor with an improved bias reduction technique. In a preferred embodiment, the angular rate sensor includes a phase servo that operates to reduce the phase shift between the accelerometer output signal and the demodulation time reference.

In one preferred embodiment, the angular rate sensor comprises an accelerometer assembly, timing/control means, first and second demodulation means, rate channel means, and delay control means. The accelerometer assembly comprises first and second accelerometers mounted such that their force sensing axes are parallel to a common sensing axis, and means for vibrating the accelerometers along arcs, each of which is tangent to a vibration axis normal to the sensing axis. In this context, the term "parallel" should be understood to include "antiparallel." In a preferred embodiment, the force sensing axes of the accelerometers are antiparallel to one another. The accelerometer assembly also includes drive means for vibrating the accelerometers along their respective arcs at a first frequency in response to a periodic drive signal at the first frequency. Thus the output signal of each accelerometer includes a component at a second frequency equal to twice the first frequency.

The timing/control means generates a periodic master timing signal from which the drive signal is derived. The master timing signal is also used to generate first and second timing signals. The first timing signal represents a first rate component at the first frequency in quadrature phase with respect to the drive signal, and a first phase shift component at the second frequency in phase with the drive signal, the first timing signal being delayed by a first time delay that is a predetermined function of a first delay signal. In a similar manner, the timing/control means generates a second timing signal that represents second rate and phase servo components, and that is delayed by a second time delay that is a predetermined function of a second delay signal. The first demodulation means demodulates the first output signal using the first rate component to produce a first rate signal, and demodulates the first output signal using the first phase shift component to produce a first phase shift signal. Similarly, the second demodulation means demodulates the second output signal using the second rate component to produce a second rate signal, and demodulates the second output signal using the second phase shift component to produce a second phase shift signal. The rate signals are used by the rate channel means to provide a measure of angular rate about an axis normal to the sensitive vibration axes.

The delay control means receives the first and second phase shift signals, and produces the first and second delay signals. In a preferred embodiment, the delay control means produces a first offset signal representing the estimated difference, at the second frequency, between the phase shift corresponding to the first time delay and the phase shift between the drive signal and the periodic components of the first output signal. The delay control means compares the first offset signal to the first phase shift signal, to produce a first error signal representing the difference therebetween. In a similar manner, the delay control means produces a second offset signal representing the estimated difference, at the second frequency, between the phase shift corresponding to the second time delay and the phase shift between the drive signal and the periodic components of the second output signal. The second offset signal is compared to the second phase shift signal to produce a second error signal representing the difference therebetween. The first and second error signals are used to produce the first and second delay signals, such that the difference between the first and second error signals is driven towards a null value.

In a preferred embodiment, the delay control means produces the first and second delay signals so as to reduce the magnitude of the larger of the two error signals. In a further embodiment, means are provided enabling the rate channel means to calculate a correction term for correcting the measure of angular rate, the correction term being a function of the first and second error signals and of signals representing the angular misalignments of the accelerometers with respect to the sensing axis. An embodiment of the invention comprising a single accelerometer is also disclosed.

DETAILED DESCRIPTION OF THE INVENTION

In an angular rate sensor of the type described in U.S. Pat. Nos. 4,590,801 and 4,665,748, the rate bias caused by the interaction of misalignment and phase shift is proportional to:

$$2(\alpha_1 \sin\phi_1 + \alpha_2 \sin\phi_2) \tag{1}$$

where $\alpha_1$ and $\alpha_2$ are the misalignments of the accelerometers, and $\phi_1$ and $\phi_2$ are the corresponding net phase shifts between the accelerometer output signals and the demodulation time reference. In general, each phase shift will be equal to the phase shift between the accelerometer vibration motion and the accelerometer output signal caused by such vibration, plus the phase shift between the drive signal and the actual accelerometer motion, less the phase correction introduced by the present invention, as described below. In general, the phase shift between the accelerometer motion and the accelerometer output signal will be much greater than the phase shift between the drive signal and the accelerometer motion. For the normal case in which $\phi_1$ and $\phi_2$ are small angles, either by design, by adjustment of the phase offset control described in U.S. Pat. No. 4,510,802, or by the phase servo of the present invention, Equation (1) can be written as:

$$(\alpha_1+\alpha_2)(\phi_1+\phi_2)+(\alpha_1-\alpha_2)(\phi_1-\phi_2) \tag{2}$$

The nulling system described in U.S. Pat. No. 4,665,748 tends to make $\alpha_1$ equal to $-\alpha_2$, to thereby drive the first term of Equation (2) to zero. However, the second term of Equation (2) will still produce a bias error, unless the accelerometer phase shifts are equal to one another. In one embodiment, the present invention provides a phase servo that attempts to set $\phi_1$ equal to $\phi_2$, and/or to drive each of $\phi_1$ and $\phi_2$ to zero. In a second aspect of the invention, the quantities $\alpha_1$, $\alpha_2$, $\phi_1$ and $\phi_2$ are determined, and the second term of Equation (2) is evaluated and subtracted from the calculated angular rate, in effect subtracting out a known bias error. In a preferred embodiment, both techniques are used to minimize bias error. In a second preferred embodiment, Equation (2) is used to subtract out the known bias error, and a fixed offset is set during laboratory calibration, as described in U.S. Pat. No. 4,510,802.

The present invention is preferably implemented in a rate sensor in which a pair of accelerometers having antiparallel sensitive axes are vibrated 180 degrees out of phase with one another along a common vibration axis, in the manner described in U.S. Pat. No. 4,590,801. However, for ease of description, the phase servo aspect of the present invention will initially be described in the context of the single accelerometer embodiment shown in FIG. 1. This embodiment includes accelerometer assembly 12, timing/control circuit 30, demodulator 32, angular rate channel 34, and phase shift estimator 36. Accelerometer assembly 12 includes linear accelerometer 14 that produces an output signal on line 22, the output signal being a function of the acceleration of accelerometer 14 along sensitive axis S that is aligned parallel to the Z axis. Accelerometer 14 is vibrated along arcuate path 16 that is tangent to vibration axis V that in turn is parallel to the Y axis and normal to the sensitive axis. The vibration is performed in a manner such that sensitive axis S remains parallel to the Z axis during the vibration motion. The accelerometer assembly vibrates the accelerometer in response to (and synchronously with) a drive signal proportional to $\sin\omega t$ on line 20. The designation $\sin\omega t$ for the drive signal indicates that accelerometer 14 is at its vibration midpoint at time $t=0$.

Figure 1:
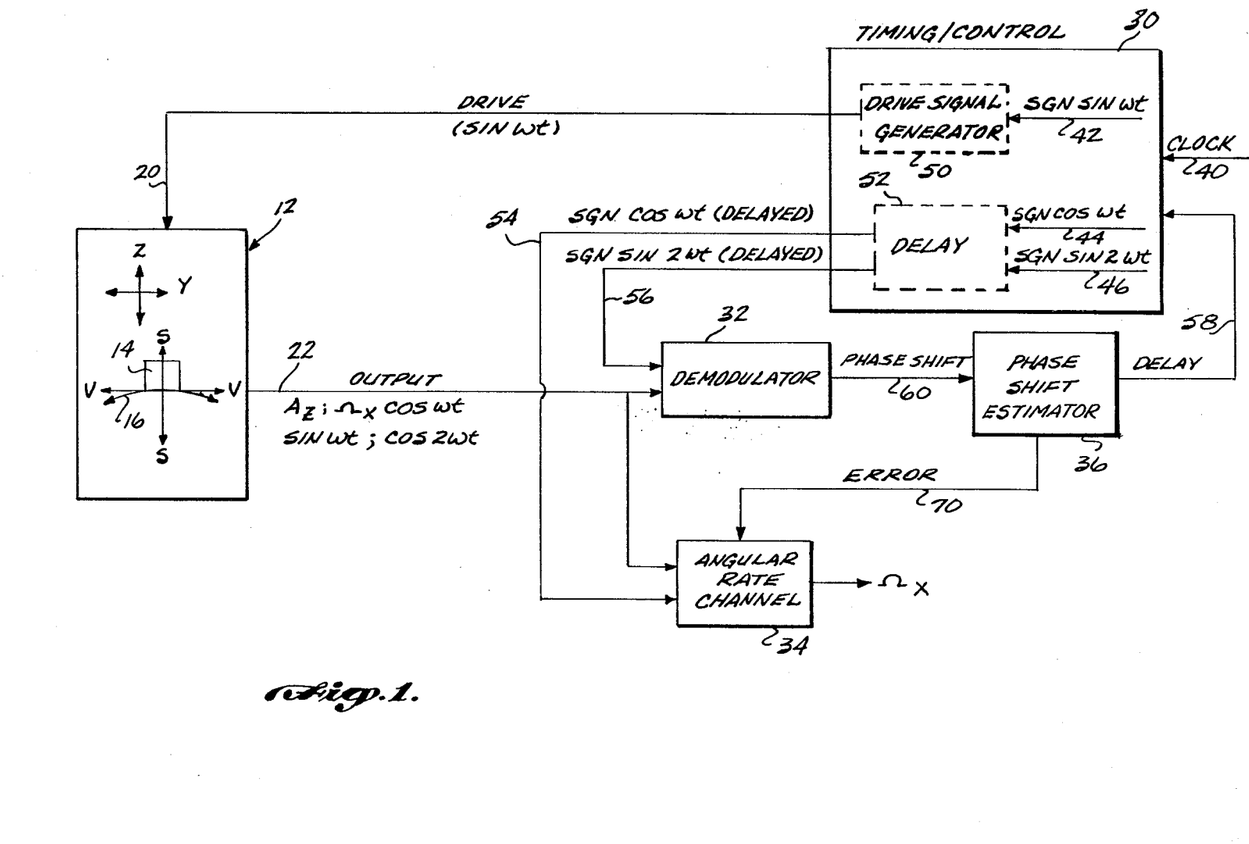
FIG. 1 is a schematic block diagram of a preferred embodiment of the angular rate sensor and phase servo of the present invention.

As set forth in U.S. Pat. No. 4,510,802, the acceleration experienced by accelerometer 14 along its sensitive axis, due to vibration along path 16, is given by:

$$\omega^2 R\theta\sin\psi\sin\omega t + \omega^2 R\theta^2 \cos\psi\cos 2\omega t \tag{3}$$

where $\omega$ is the angular frequency of vibration, R is the radius of curvature of path 16, $\psi$ is the initial offset of the vibration, and $\theta$ is the amplitude of vibration. Thus the output signal produced by accelerometer 14 on line 22 will include four components: a linear acceleration component $A_Z$ due to linear acceleration along the Z axis; a Coriolis component proportional to $\Omega_x \cos\omega t$, where $\Omega_x$ is the angular rate of accelerometer assembly 12 about an X axis that is directed out of the plane of the figure in FIG. 1; and components proportional to $\sin\omega t$ and $\cos 2\omega t$ as per Equation (3) above. As described in U.S. Pat. No. 4,665,748, the output signal from accelerometer 14 may be processed, together with the output signal of a second accelerometer that is vibrated in an opposite direction with its sensitive axis antiparallel to that of accelerometer 14, to produce a signal proportional to angular rate $\Omega_x$.

Operation of the signal processing elements illustrated in FIG. 1 will now be described. To simplify the discussion, it will be assumed that the $A_z$ and $\sin\omega t$ components can be ignored. The purpose of the signal processing elements is to process the output signal on line 22 to produce a signal indicative of angular rate $\Omega_x$. In general, this can be accomplished by demodulating the output signal with a periodic signal synchronous with $\cos\omega t$. However, in an actual system, there will be a phase shift between the periodic components of the output signal and the drive signal on line 20. Thus ideally, the demodulation of the output signal should be performed by a signal synchronous with $\cos\omega t$ that has been time delayed or phase shifted by an amount corresponding to the phase shift $\phi_\omega$ introduced by the accelerometer assembly at frequency $\omega$. The phase shift of a periodic signal produced by a time delay $T_d$ is equal to $\omega T_d$, where $\omega$ is the angular frequency of the signal. As previously described, the phase shift $\phi_\omega$ is the sum of a comparatively large phase shift between the accelerometer motion and the periodic output signal components, and a comparatively small phase shift between the drive signal and the accelerometer motion.

A phase servo technique for delaying the $\cos\omega t$ demodulation signal by the required amount is described below. This system can be most readily understood by first describing an open loop version of the system, without the phase servo closed. In this formulation, the required time delay of the $\cos\omega t$ demodulation signal is determined by first measuring the phase shift of the output signal component proportional to $\cos 2\omega t$, thus determining the phase shift $\phi_{2\omega}$ of the accelerometer assembly at frequency $2\omega$. The phase shift of the output signal component proportional to $\cos 2\omega t$ is determined by demodulating the output signal with a signal synchronous with $\sin 2\omega t$. Once the phase shift $\phi_{2\omega}$ has been determined, it is used to estimate the phase shift $\phi_\omega$ at frequency $\omega$. The estimated phase shift $\phi_\omega$ is then converted to the required time delay $T_d$, using the relation $T_d = \phi_\omega/\omega$.

In an actual phase servo according to the present invention, time delay $T_d$ is used to delay both the $\sin 2\omega t$ and $\cos\omega t$ demodulation signals. This is accomplished by a phase servo loop comprising timing/control circuit 30, demodulator 32, and phase shift estimator 36. Timing/control circuit 30 receives an appropriate clock signal on line 40, and uses the clock signal to generate the timing signals SGN $\sin\omega t$, SGN $\cos\omega t$, and SGN $\sin 2\omega t$ on lines 42, 44 and 46, respectively. The symbol "SGN" represents "sign off", and the signals on lines 42, 44 and 46 may comprise any signals that encode the sign of the corresponding periodic functions. It will be appreciated by those skilled in the art that these signals on lines 42, 44 and 46 may comprise a single periodic signal at frequency $4\omega$. The SGN $\sin\omega t$ signal on line 42 is input to drive signal generator 50, and is used by the drive signal generator to generate a sinusoidal drive signal $\sin\omega t$ on line 20. Accelerometer assembly 12 responds to the drive signal by vibrating accelerometer 14 along path 16, as described above.

The SGN $\cos\omega t$ and SGN $\sin 2\omega t$ signals on lines 44 and 46 are input to delay circuit 52 that produces delayed versions of these signals on lines 54 and 56, respectively, the amount of the delay being controlled by a delay signal on line 58. The delayed versions of the signals on lines 44 and 46 may comprise a single periodic signal at frequency $4\omega$ that includes a rate component representing $\cos\omega t$ and a phase shift component representing $\sin 2\omega t$. The delayed SGN $\cos\omega t$ signal on line 54 (i.e., the rate component) is used by angular rate channel 34 to demodulate the output signal on line 22, in order to determine angular rate $\Omega_x$ about an X axis perpendicular to the Y and Z axes. The purpose of the delay introduced by delay circuit 52 is to phase shift the demodulation signal on line 54 by an amount equal to the phase shift of accelerometer assembly 12. In accordance with the present invention, the delay introduced by delay circuit 52 is determined by the delay signal on line 58 that, in turn, is determined by demodulator 32 and phase shift estimator 36.

Demodulator 32 demodulates the output signal using the SGN $\sin 2\omega t$ demodulation signal (i.e., the phase shift component) on line 56. The resulting phase shift signal produced by demodulator 32 on line 60 represents the difference, at twice the drive signal frequency, between the phase shift of accelerometer assembly 12 and the phase shift corresponding to time delay $T_d$. This phase shift signal is input to phase shift estimator 36. Phase shift estimator 36 compares the phase shift signal to an offset signal generated by the phase shift estimator based upon the current delay signal. The offset signal represents an estimate of the difference, at twice the drive signal frequency, between the phase shift produced by accelerometer assembly 12 and the phase shift corresponding to the present time delay $T_d$. The phase shift estimator subtracts the offset signal from the phase shift signal, and produces an error signal corresponding to the difference therebetween. The phase shift estimator then updates the delay signal based on the error signal, such that the error signal is driven towards a null value. The error signal may also be input to angular rate channel 34 via line 70, and used by the angular rate channel to refine the calculation of angular rate.

Figure 2:
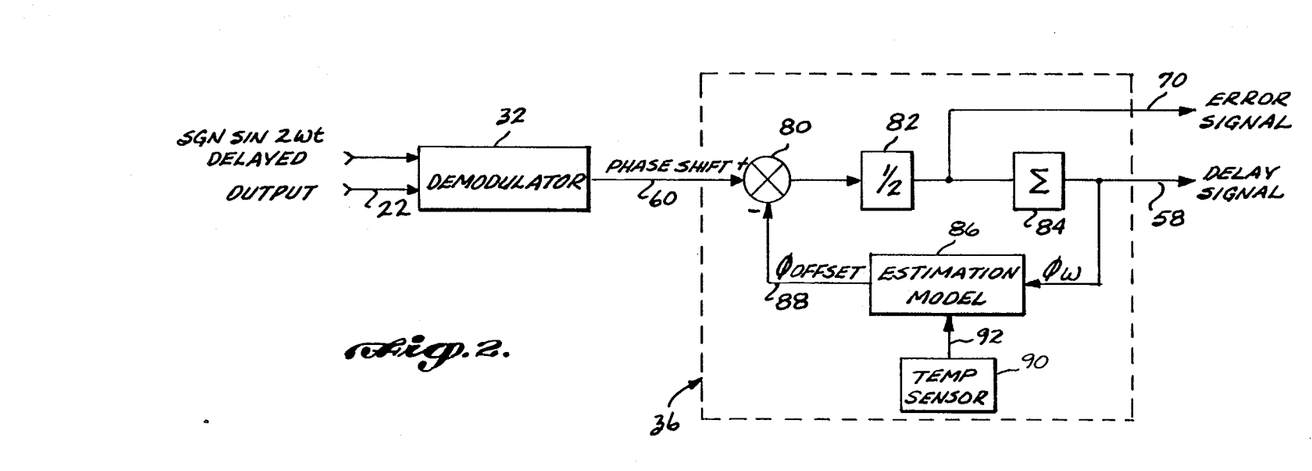
FIG. 2 is a block diagram of a preferred embodiment of the phase shift estimator.

A preferred embodiment for phase shift estimator 36 is illustrated in FIG. 2. The phase shift estimator may be implemented in the digital domain by a programmed data processor, or by analog signal processing components. In general, a digital implementation will be preferred, for higher accuracy. Thus use, for example, of the term "signal" herein should be understood to include digital words produced by a data processor, as well as analog signals. The phase shift estimator comprises summation point 80, scaler 82, summing block 84, and estimation model 86, and temperature sensor 90. The delay signal produced by summing block 84 on line 58 is an estimate of the phase shift $\phi_\omega$ of the accelerometer output signal with respect to the drive signal at frequency $\omega$. Estimation model 86 receives the signal $\phi_\omega$, and produces an offset signal $\phi_{offset}$ on line 88 that is an estimate of the difference between the phase shift of the output signal at frequency $2\omega$ and the phase shift corresponding to the current delay signal at frequency $2\omega$. In the simplest case, estimation model 86 could simply assume that the phase shift at frequency $2\omega$ is equal to twice the phase shift at frequency $\omega$, so that $\phi_{offset}$ is equal to zero. This corresponds to the case of equal time delays at frequencies $\omega$ and $2\omega$. However, if it is assumed that accelerometer assembly 12 can be modeled as a second order system, then a more accurate estimate of phase shift at $2\omega$ can be determined as follows.

$$\phi_{offset} = \qquad (4)$$

$$\sin\left[\tan^{-1}\left(\frac{2\left(1-\left(\frac{\omega}{\omega_n}\right)^2\right)\tan\phi_\omega}{1-4\left(\frac{\omega}{\omega_n}\right)^2}\right) - 2\phi_\omega + \phi_c\right]$$

where $\omega_n$ is the natural frequency of the accelerometer assembly, and $\phi_c$ is a calibration value. As indicated by line 92 in FIG. 2, estimation model 86 can also provide for temperature modeling of the phase relationship. Thus, in the most general case, $\phi_{offset}$ can be modeled as a polynomial function only of $\phi_\omega$ and temperature. In general, the estimation model will be a function of $\phi_\omega$, which is generated by the system, and of quantities such as $\omega$ and $\omega_n$ that are either constants or repeatable functions of temperature. It is this characteristic that makes the estimation process practical. For moderately damped second order systems, as well as for many other common low order dynamic systems, the phase shift at $2\omega$ is nearly equal to twice the phase shift at $\omega$, so that $\phi_{offset}$ is considerably less than $\phi_{2\omega}$. Thus the refinement provided by Equation (4) is comparatively small, and the exact form of the estimation model will not be critical for many applications.

Summing junction 80 determines the difference between the phase shift signal on line 60 and the $\phi_{offset}$ signal on line 88, and scaler 82 then converts this difference to the $\omega$ (rather than $2\omega$) domain by multiplying the difference signal by one-half. The result is the error signal on line 70 that represents the difference between the phase shift signal and the current estimate $\phi_{offset}$ of the phase shift signal. The error signal is integrated by summing block 84 to produce the delay signal on line 58, an arrangement that operates to continuously drive the error signal towards a null value.

Figure 3:
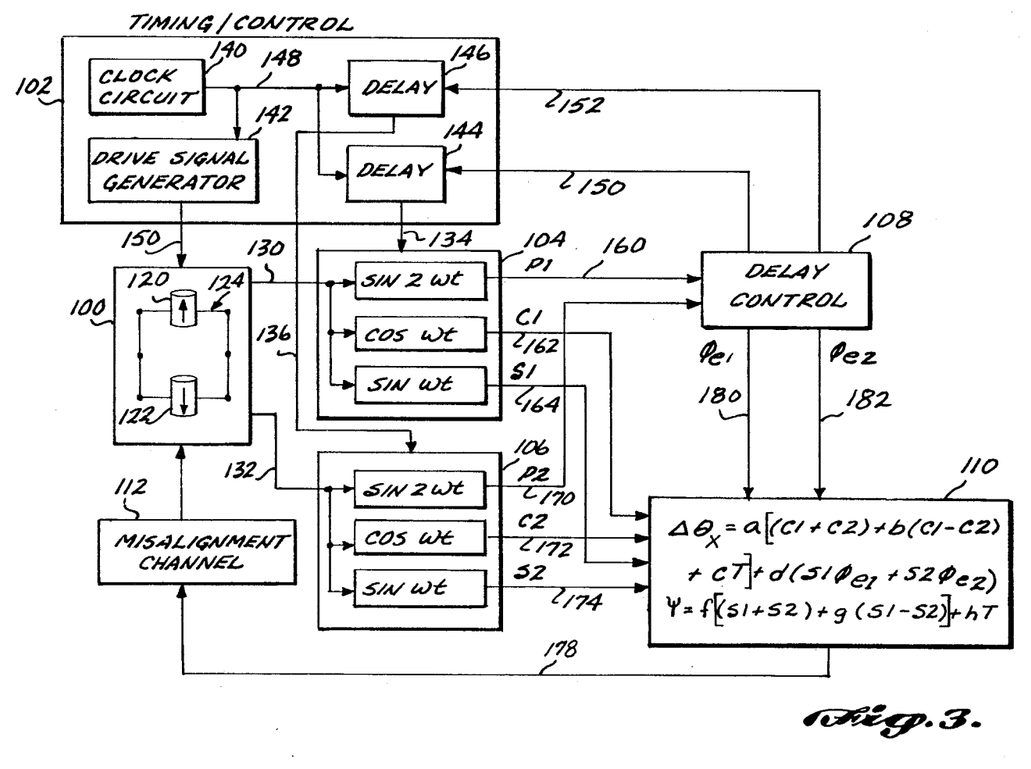
FIG. 3 is a block diagram of an angular rate sensor of the present invention comprising a pair of accelerometers.
Figure 4:
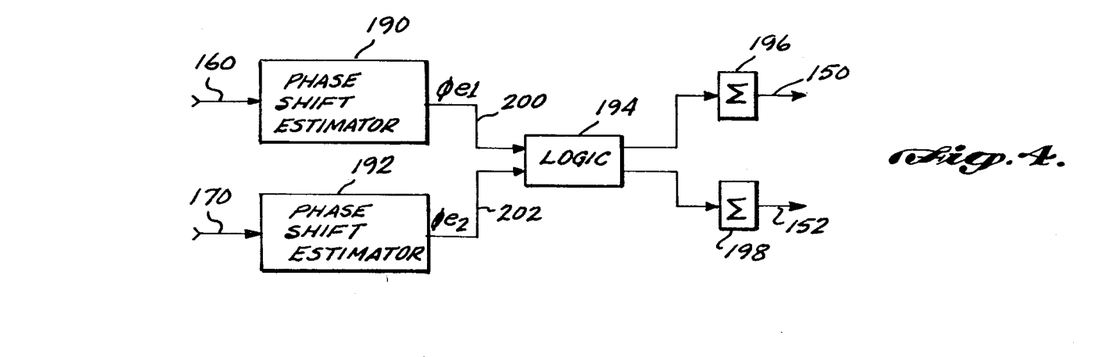
FIG. 4 is a block diagram of a preferred embodiment of the delay control circuit of FIG. 3.

A preferred embodiment of an angular rate sensor with a phase servo, in accordance with the present invention, is illustrated in FIGS. 3 and 4. This angular rate sensor includes accelerometer assembly 100, timing/control circuit 102, demodulators 104 and 106, delay control circuit 108, angular rate channel 110, and misalignment channel 112. Accelerometer assembly 100 includes accelerometers 120 and 122 that are mounted in a parallelogram assembly 124, such as the one described in U.S. Pat. No. 4,590,801. Accelerometers 120 and 122 are positioned with their sensitive axes antiparallel, and are vibrated along a vibration axis 180° out of phase with one another. The vibration axis is normal to the sensitive axes of the accelerometers. Accelerometers 120 and 122 produce output signals on lines 130 and 132, respectively.

The output signal from accelerometer 120, on line 130, is processed by demodulator 104, and the output signal of accelerometer 122, on line 132, is processed by demodulator 106. Demodulators 104 and 106 are controlled by timing signals for timing/control circuit 102 on lines 134 and 136, respectively. The timing/control circuit includes clock circuit 140, drive signal generator 142, and delay circuits 144 and 146. Clock circuit 140 produces a master timing signal on line 148 that defines the vibration cycle at frequency $\omega$. By way of example, the master timing signal on line 148 could comprise a series of pulses or edges spaced at intervals of $\pi/2\omega$. The master timing signal is received by drive signal generator 142, and is used by the drive signal generator to produce a drive signal on line 150 that is synchronous with $\sin\omega t$.

Delay circuit 144 receives the master timing signal, and produces a delayed timing signal on line 134, the amount of the delay being controlled by a delay signal received on line 150. In a similar manner, delay circuit 146 receives the master timing signal, and produces a delayed timing signal on line 136, the amount of the delay being controlled by a delay signal on line 152. Each delayed timing signal includes a phase shift component representing $\sin 2\omega t$, a rate component representing $\cos\omega t$, and an alignment component representing $\sin\omega t$. Demodulator 104 uses the delayed timing signal on line 134 to demodulate the output signal of accelerometer 120 by the functions $\sin 2\omega t$, $\cos\omega t$ and $\sin\omega t$, to produce, respectively, a phase shift signal P1 on line 160, a rate signal C1 on line 162, and an alignment signal S1 on line 164. Similarly, demodulator 106 demodulates the output signal from accelerometer 122, using the delayed timing signal on line 136, to produce a phase shift signal P2 on line 170, a rate signal C2 on line 172, and an alignment signal S2 on line 174.

The phase shift signals P1 and P2 on lines 160 and 170 are input to delay control circuit 108. The delay control signal compares the phase shift signals on lines 160 and 170 to the current delay signals on lines 150 and 152 respectively, and generates error signals $\phi_{e1}$ and $\phi_{e2}$ on lines 180 and 182 respectively, corresponding to the differences between the phase shift and current delay signals. Delay control circuit 108 adjusts the delay signals on lines 150 and 152, such that the difference between the error signals $\phi_{e1}$ and $\phi_{e2}$ is driven towards zero. In general, this may be accomplished by making the error signals equal to one another, and/or by making both error signals equal to zero.

The error signals are input to angular rate channel 110, together with the signals C1, C2, S1 and S2 from demodulators 104 and 106. For an accelerometer assembly of the type described, it may be shown that the angular change about the X axis $\Delta\theta_x$ during a vibration period T is given by:

$$\Delta\theta_x = a[C1+C2+b(C1-C2)+cT]+d[S1\phi_{e1}+S2-\phi_{e2}] \qquad (5)$$

In this equation, a, b, c and d are temperature modeled coefficients. The first bracketed term in Equation (5) corresponds to Equation (7) in U.S. Pat. No. 4,665,748, while the second bracketed term in Equation (5) corresponds to the second term in Equation (2) above. Angular rate channel 110 implements Equation (5), to determine $\Delta\theta_x$ for each vibration period, and thus measure angular rate about the X axis. Angular rate channel 110 may also utilize the S1 and S2 values to generate a misalignment command $\Psi$ on line 178 that is input to misalignment channel 112. Misalignment channel 112 is described in greater detail in U.S. Pat. No. 4,665,748. The misalignment command is preferably generated as indicated in block 110, with f, g and h being temperature modeled coefficients.

For a system in which delay control circuit 108 seeks only to drive each error signal $\phi_{e1}$ and $\phi_{e2}$ to zero, the delay control circuit may simply comprise two unconnected circuits similar to phase shift estimator 36 shown in FIG. 2. However, referring to Equation (2), it can be seen that even if $\phi_{e1}$ and $\phi_{e2}$ have nonzero values, the second term of Equation (2) can be driven to zero by making $\phi_{e1}$ equal to $\phi_{e2}$. Thus in a preferred embodiment, the delay control circuit also seeks to set the error signals $\phi_{e1}$ and $\phi_{e2}$ equal to one another, as well as to set each error signal to zero. A preferred embodiment of such a delay circuit is shown in FIG. 4. The delay control circuit comprises phase shift estimators 190 and 192, logic circuit 194, and summing blocks 196 and 198. Each of phase shift estimators 190 and 192 may be identical to phase shift estimator 36 shown in FIG. 2. Phase shift estimators 190 and 192 produce error signals $\phi_{e1}$ and $\phi_{e2}$ on lines 200 and 202 respectively. Logic block 194 examines the signals $\phi_{e1}$ and $\phi_{e2}$, and determines which is the larger of the two. If $\phi_{e1}$ is larger, then logic block 194 decrements the count stored in summing block 196, thereby reducing the delay signal produced by summing block 196 on line 150. This operation accomplishes both goals of reducing the magnitude of $\phi_{e1}$ and making $\phi_{e1}$ more equal to $\phi_{e2}$. Similarly, if $\phi_{e2}$ is greater than $\phi_{e1}$, logic block 194 decrements the count stored in summing block 198. Referring to FIG. 2, it will be appreciated that summing blocks 196 and 198 perform an operation similar to that performed by summing block 84, i.e., an integration of the corresponding error signal.

While the preferred embodiments of the invention have been illustrated and described, variation will be apparent to those skilled in the art. The invention is therefore not to be limited to the described embodiments, but the scope of the invention is rather to be determined by a reference of the following claims.

The embodiments of the invention in which an exclusive property or privilege is claimed are defined as follows:

1. A device for generating an angular rate signal representing the angular rate of rotation of a body, the device comprising:

an accelerometer assembly comprising a first accelerometer having a first force sensing axis and including means for producing a first output signal indicative of acceleration along the first force sensing axis, a second accelerator having a second force sensing axis and including means for producing a second output signal indicative of acceleration along the second force sensing axis, means for mounting the first and second accelerometers such that their force sensing axes are both parallel to a common sensing axis and such that the accelerometers can be vibrated along respective arcs each of which is tangent to a vibration axis normal to the sensing axis, and drive means connected to receive a periodic drive signal having a first frequency, the drive means including means for vibrating the accelerometers along the respective arcs at the first frequency, such that each output signal includes a component at a second frequency equal to twice the first frequency;

timing/control means including means for generating a periodic master timing signal, means for generating the drive signal such that the drive signal bears a predetermined phase relationship to the master timing signal, means for generating a first timing signal such that the first timing signal represents a first rate component at the first frequency in quadrature phase with respect to the drive signal and a first phase shift component at the second frequency in phase with the drive signal, means for delaying the first timing signal by a first time delay that is a predetermined function of a first delay signal to thereby produce a delayed first timing signal, and means for generating a second timing signal such that the second timing signal represents a second rate component at the first frequency in quadrature phase with respect to the drive signal and a second phase shift component at the second frequency in phase with the drive signal, and means for delaying the second timing signal by a second time delay that is a predetermined function of a second delay signal to thereby produce a delayed second timing signal;

first demodulation means connected to receive the first output signal and the delayed first timing signal, and including means for demodulating the first output signal using the first rate component to produce a first rate signal, and means for demodulating the first output signal using the first phase shift component to produce a first phase shift signal;

second demodulation means connected to receive the second output signal and the delayed second timing signal, and including means for demodulating the second output signal using the second rate component to produce a second rate signal, and means for demodulating the second output signal using the second phase shift component to produce a second phase shift signal;

rate channel means for receiving the first and second rate signals and for producing the angular rate signal indicating angular rate about an axis normal to the sensitive and vibration axes; and delay control means connected to receive the first and second phase shift signals, including means for producing a first offset signal representing the estimated difference, at the second frequency, between the phase shift corresponding to the first time delay and the phase shift between the drive signal and the periodic components of the first output signal, means for comparing the first offset signal to the first phase shift signal to produce a first error signal representing the difference therebetween, means for producing a second offset signal representing the estimated difference, at the second frequency, between the phase shift corresponding to the second time delay and the phase shift between the drive signal and the periodic components of the second output signal, means for comparing the second offset signal to the second phase shift signal to produce a second error signal representing the difference therebetween, and means responsive to the first and second error signals for producing the first and second delay signals such that the difference between the first and second error signals is driven towards a null value.

2. The device of claim 1, wherein the delay control means includes means for determining the larger of the first and second error signals, and for changing the corresponding delay signal so as to reduce the magnitude of the larger error signal.

3. The device of claim 1, wherein the means for producing each offset signal comprises means connected to receive the corresponding delay signal and for using a predetermined estimation model for determining therefrom the offset signal.

4. The device of claim 3, further comprising a temperature sensor for providing a temperature signal to each estimation model, and wherein each estimation model determines the offset signal as a function of the corresponding delay signal and the temperature signal.

5. The device of claim 3, wherein each estimation model models the accelerometer assembly as a second order system.

6. The device of claim 3, wherein each estimation model estimates the offset signal as a polynomial function of the corresponding delay signal.

7. The device of claim 1, wherein for each offset signal, the delay control means determines the corresponding error signal by subtracting the offset signal from the corresponding phase shift signal, and multiplying the difference by one-half.

8. The device of claim 7, wherein the delay control means produces each delay signal by integrating the corresponding error signal.

9. The device of claim 1, wherein the rate channel means includes means for receiving the first and second error signals, and means for correcting the angular rate signal by subtracting a correction term therefrom, the correction term being a predetermined function of the first and second error signals.

10. A device for generating an angular rate signal representing the angular rate of rotation of a body, the device comprising:

an accelerometer assembly comprising a first accelerometer having a first force sensing axis and including means for producing a first output signal indicative of acceleration along the first force sensing axis, a second accelerometer having a second force sensing axis and including means for producing a second output signal indicative of acceleration along the second force sensing axis, means for mounting the first and second accelerometers such that their force sensing axes are both parallel to a common sensing axis and such that the accelerometers can be vibrated along respective arcs each of which is tangent to a vibration axis normal to the sensing axis, and drive means connected to receive a periodic drive signal having a first frequency, the drive means including means for vibrating the accelerometers along the respective arcs at the first frequency, such that each output signal includes a component at a second frequency equal to twice the first frequency;

timing/control means including means for generating a periodic master timing signal, means for generating the drive signal such that the drive signal bears a predetermined phase relationship to the master timing signal, means for generating a first timing signal such that the first timing signal represents a first rate component at the first frequency in quadrature phase with respect to the drive signal, a first phase shift component at the second frequency in phase with the drive signal, and a first alignment component at the first frequency in phase with the drive signal, and means for generating a second timing signal such that the second timing signal represents a second rate component at the first frequency in quadrature phase with respect to the drive signal, a second phase shift component at the second frequency in phase with the drive signal, and a second alignment component at the first frequency in phase with the drive signal;

first demodulation means connected to receive the first output signal and the first timing signal, and including means for demodulating the first output signal using the first rate component to produce a first rate signal, means for demodulating the first output signal using the first alignment component to produce a first alignment signal, and means for demodulating the first output signal using the first phase shift component to produce a first phase shift signal;

second demodulation means connected to receive the second output signal and the second timing signal, and including means for demodulating the second output signal using the second rate component to produce a second rate signal, means for demodulating the second output signal using the second alignment component to produce a second alignment signal, and means for demodulating the second output signal using the second phase shift component to produce a second phase shift signal;

control means including means for receiving the first and second phase shift signals, means for producing a first error signal representing the phase shift, at the second frequency, between the first timing signal and the periodic components of the first output signal, and means for producing a second error signal representing the phase shift, at the second frequency, between the second timing signal and the periodic components of the second output signal; and rate channel means for receiving the first and second rate signals and for producing the angular rate signal indicative of angular rate about an axis normal to the sensing and vibration axes, the rate channel means further including means for receiving the first and second alignment signals and the first and second error signals, and for correcting said angular rate signal by a term proportional to the sum of the product of the first alignment signal multiplied by the first error signal plus the product of the second alignment signal multiplied by the second error signal.

11. The device of claim 10, said control means further including means for protruding a first offset signal representing an estimated phase shift between the first timing signal and the periodic components of the first output signal, means for comparing the first offset signal to the first phase shift signal to produce the first error signal representing the difference therebetween, means for producing a second offset signal representing an estimated phase shift between the second timing signal and the periodic components of the second output signal, and means for comparing the second offset signal to the second phase shift signal to produce the second error signal representing the difference therebetween; and wherein for each offset signal, the means for producing the offset signal comprises means for integrating the corresponding error signal to produce a delay signal, and estimation means for receiving the delay signal and for using a predetermined estimation model for determining therefrom the offset signal.

12. The device of claim 11, further comprising a temperature sensor for providing a temperature signal to each estimation model, and wherein each estimation model determines the offset signal as a function of the delay signal and temperature signal.

13. The device of claim 11, wherein each estimation model models the acceleration assembly as a second order system.

14. The device of claim 11, wherein each estimation model estimates the offset signal as a polynominal function of the corresponding delay signal.

15. A device for generating an angular rate signal representing the angular rate of rotation of a body, the device comprising:

an accelerometer assembly comprising an accelerometer having a force sensing axis and including means for producing an output signal indicative of acceleration along the force sensing axis, means for mounting the accelerometer such that the accelerometer can be vibrated along an arc that is tangent to a vibration axis normal to the force sensing axis, and drive means connected to receive a periodic drive signal having a first frequency and to vibrate the accelerometer along the arc at said frequency, such that the output signal includes a component at a second frequency equal to twice the first frequency;

timing/control means including means for generating the drive signal, means for generating a timing signal such that the timing signal represents a rate component at the first frequency in quadrature phase with respect to the drive signal and a phase shift component at the second frequency in phase with the drive signal, and means for delaying the timing signal by a time delay that is a predetermined function of a delay signal;

demodulation means including means for demodulating the output signal using the rate component to produce the angular rate signal representing the angular rate about an axis normal to the sensitive and vibration axes, and means for demodulating the output signal using the phase shift component to produce a phase shift signal; and delay control means connected to receive the phase shift signal and including means for producing an offset signal representing the estimated difference, at the second frequency, between the phase shift corresponding to the time delay and the phase shift between the drive signal and the periodic components of the output signal, means for comparing the offset signal to the phase shift signal to produce an error signal representing the difference therebetween, and means responsive to the error signal for producing the delay signal such that the error signal is driven toward a null value.

16. The device of claim 15, wherein the means for producing the offset signal comprises means connected to receive the delay signal and for using a predetermined estimation model for determining therefrom the offset signal.

17. The device of claim 15, further comprising a temperature sensor for providing a temperature signal to the estimation model, and wherein the estimation model determines the offset signal as a function of the delay signal and the temperature signal.

18. The device of claim 15, wherein the estimation model models the accelerometer assembly as a second order system.

19. The device of claim 16, wherein the estimation model estimates the offset signal as a polynomial function of the delay signal.

* * * * *